United States Patent [19]

Seem

[11] 4,169,536
[45] Oct. 2, 1979

[54] HARVESTING MACHINE WITH AN EXPANDABLE TRUCK LOADER

[76] Inventor: David M. Seem, Seem Dr., Kutztown, Pa. 19530

[21] Appl. No.: 845,966

[22] Filed: Oct. 27, 1977

[51] Int. Cl.² .............................................. B60P 1/36
[52] U.S. Cl. .................................... 414/334; 198/316; 198/564; 414/503; 414/505
[58] Field of Search ................ 214/41 R, 42 R, 83.26, 214/520, 521, 522; 198/312, 313, 315, 316, 594, 595, 864

[56] References Cited

U.S. PATENT DOCUMENTS

| 3,437,220 | 4/1969 | Gates | 214/42 R |
| 3,512,669 | 5/1970 | Benedict et al. | 214/83.26 X |
| 3,824,660 | 2/1958 | Ensinger | 198/312 X |

*Primary Examiner*—Robert G. Sheridan

[57] ABSTRACT

A truck loader is provided for loading tomatoes from a harvester machine onto a truck and includes means for extending or retracting the loader to different positions so that the harvester machine may pass through different rows of crop and load the truck traveling along the same path at different distances.

3 Claims, 5 Drawing Figures

HARVESTING MACHINE WITH AN EXPANDABLE TRUCK LOADER

Harvesting machines for mechanically taking whole tomato plants and the like from a field, shaking the tomatoes off the vines and then separating them from their leaves, dirt and other material are well known. After all of these operations, the tomatoes are generally visually inspected and sorted before loading them into trucks.

In the loading of the tomatoes, or other crop, into a truck, the harvesting machine generally makes a relatively large number of passes through a field. The harvesting machine may pass up and down a field in parallel rows, or may pass around the field in generally circular or rectangular directions, moving across a different line or row of crops as it moves and performs the cutting operations.

As the harvesting machine cuts the crop, a truck for receiving the finally inspected fruit or crop generally moves along side of the harvesting machine in parallel paths.

Heretofore, the truck for receiving the crops from the harvesting machine has generally maintained the same relative distance from the harvesting machine during the harvesting operation. This has resulted in a number of disadvantages.

First, in many harvesting machines, all the tomatoes are not shaken off the plants which are dropped back on the field. In some cases, it may be profitable to manually pick the tomatoes which were unshaken from the vines in the field. A truck, moving alongside the harvesting machine, passes over a previously cut row thereby damaging whatever tomatoes may still be on the vines and suitable for picking.

A second disadvantage in having the truck maintain the same relative distance from the harvesting machine during operation, involves the ground on which the crop is planted. Very often, the ground is relatively soft. After the truck has passed through one row, it makes tracks in the ground making the ground relatively hard at these locations. It is generally easier for the truck to move through the same path a number of times over hardened ground than it is to make new tracks for each pass. It would therefore be desirable for the truck to pass over the same tracks two or more times as the harvester machine cuts along different rows.

Another disadvantage in the present arrangement involving truck loading means fixedly secured to the harvesting machine is that the harvested crop may be loaded into the truck unevenly unless the truck continuously varies its path during the loading operation. This is generally impractical or at best inconvenient.

Expandable booms have been used extensively in many fields heretofore. For example, extendable and rectractable apparatus has been used by telephone or electrical wire repairmen where the apparatus is normally retracted and extended to permit the repairmen to reach high or distance wire. Such a patent is one issued to Thornton-Trump U.S. Pat. No. 2,815,250. Extendable and retractable apparatus has also been used in farm machinery such as in apparatus used in picking apples. One such patent is one to Girard U.S. Pat. No. 2,798,623.

Also derricks with expandable and retractable means for loading material in trucks are well known.

It is an object of this invention to provide an improved truck loading means in a harvesting machine.

It is a further object of this invention to provide an improved truck loader in a harvesting machine which permits the harvesting machine to be moved along different rows of crop and load an adjacent truck without the truck running over and destroying freshly cut crops.

It is still a further object of this invention to provide an improved truck loading means which permits a truck to receive crops from the harvesting machine as it passes through the same path to harden the ground while the harvesting machine passes through different paths.

It is still a further object of this invention to provide improved truck loading means which is capable of depositing tomatoes or the like to even depths in a truck without requiring irregular movements of the truck.

In accordance with the present invention a harvester machine includes conventional means for severing tomato plants and separating the tomatoes from the vines. The separated tomatoes are loaded into a truck from an extendable and retractable truck loader. A movable conveyor is provided for delivering the separated tomatoes to the truck loader. The movable conveyor is mounted to a frame of the harvesting machine. The truck loader is pivotally mounted to the frame so that movement of the frame and conveyor causes the truck loader to be expanded or retracted. The entire apparatus including the frame, conveyor and truck loader is movably mounted to the main body of the harvesting machine.

Other objects and advantages of the present invention will be apparent and suggest themselves to those skilled in the art from a reading of the following specification and claims, taken in conjunction with the accompanying drawing, in which:

Figure 1:
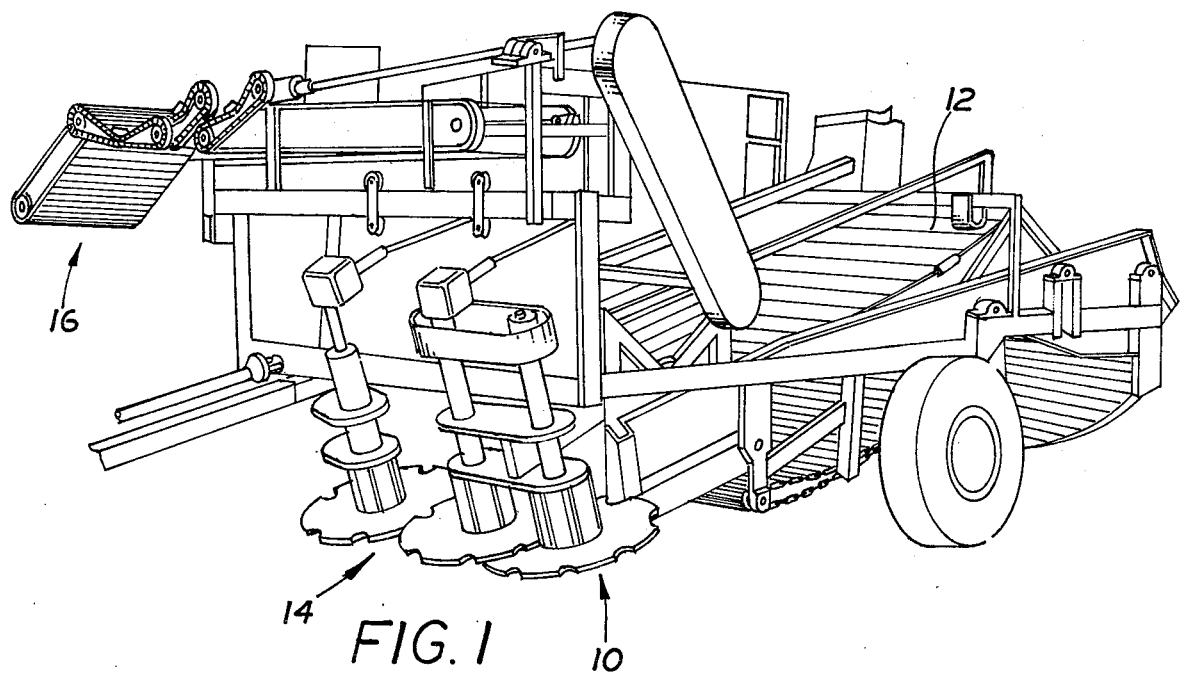
FIG. 1 is a perspective view of the main portions of a harvesting machine embodying a truck loading arrangement of the present invention.

Referring particularly to FIG. 1, a harvesting machine 10 includes the various of the elements found in conventional machines. Because of this, detailed explanations will not be given since the operation of most of the parts illustrated are well known to those skilled in the art and are not directed to the invention involved. The machine illustrated is one type in which the present invention, involving an expandable and retractable truck loader, may be employed.

The harvesting machine 10 includes a conveyor chain 12 which is associated with means for dislodging the tomatoes as they are conveyed on the conveyor chain 12. The conveyor chain 12 may include spaces between links wide enough to permit tomatoes to fall through to a second conveyor chain once they are separated from the vines. The vines, generally being longer than the largest dimension of the tomatoes, tend to remain on the conveyor chain 12 and are dumped back onto the field as the conveyor chain reaches the end of its travel. As mentioned, while it is desirable that all the tomatoes be shaken from the vines, sometimes some good tomatoes, for example, remain on the vine and are dropped back onto the field.

Various types of shakers may be used in connection with the conveyor chain 12 to vibrate it up and down at a relatively high frequency. One such a shaker may be of the type described in a copending application of the same inventor entitled "Vibrating Apparatus for a Harvesting Machine", Ser. No. 569,802 filed Apr. 21, 1975.

The tomato crop is cut by a set of three cutters 14. The set of cutters may include a set of four cutters of a type described in U.S. Pat. No. 3,921,723 issued on Nov. 25, 1975, issued to the same inventor involved in the present application.

Ultimately the tomatoes are passed through various operations such as vacuum cleaning, if necessary, where dirt and excess leaves are removed. The tomatoes are finally delivered to a point where they are visually inspected, manually sorted and loaded into a truck by a truck loader which heretofore has been maintained a fixed distance from the harvesting machine during operation.

The final or loading stage includes an extendable boom type conveyor adapted to be expanded or retracted to reach a truck at different distances. This conveyor apparatus 16 is the subject matter of this invention and therefore will be described in detail.

Figure 2:
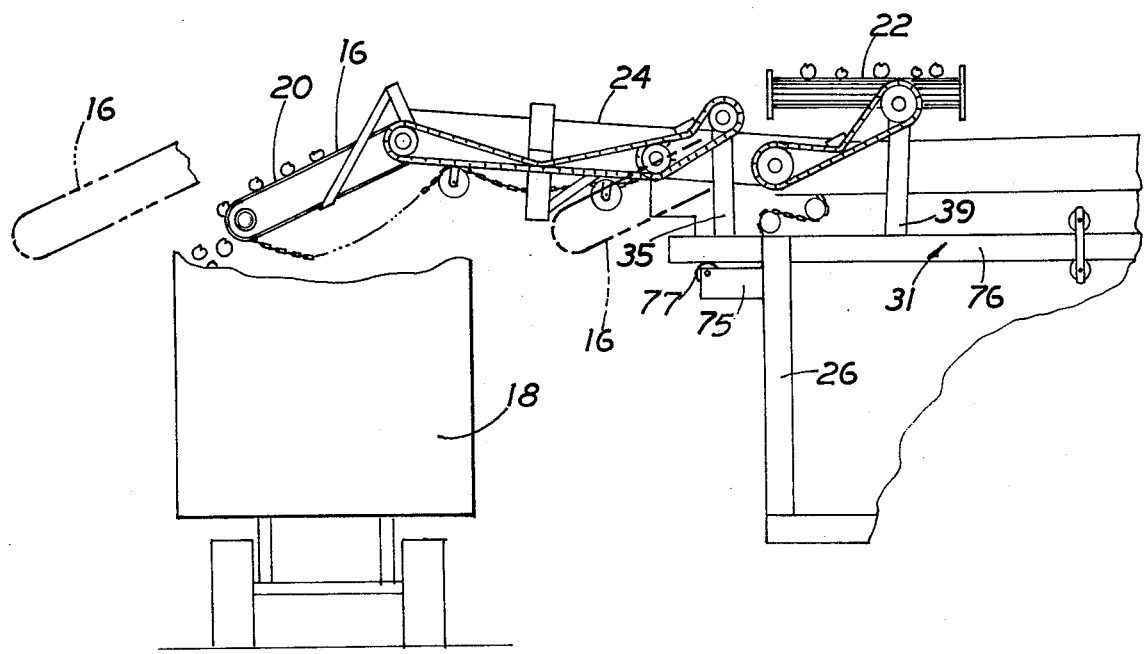
FIG. 2 is a side view of the truck loader embodying the present invention illustrating loading operations for different positions of the harvesting machine.

Referring to FIG. 2, the harvesting machine 10 is illustrated with its truck loading apparatus 16 in three different extended positions. During operation a truck 18 for receiving the finally inspected tomatoes is driven alongside the harvesting machine 10. As the harvesting machine 10 moves along different adjacent rows of crops, the truck 18 travels along the same path. An operator of the harvester machine 10, through suitable mechanical components, causes the truck loading apparatus 16 to be extended or retracted.

The apparatus 16 is illustrated in three different positions. In operation, the apparatus 16 is shifted for each new row being passed by the harvesting machine 10. In addition, the extendable boom or loading apparatus 16 may be moved any desired distances while the harvesting machine 10 is driven along the same path to permit relatively even loading of the truck 18.

The loading apparatus 16 may comprise a truck loading conveyor belt 20 driven by conventional means. As will be described, tomatoes or the like are delivered from a conveyor belt 22 onto a conveyor belt 24. The truck loading apparatus 16 and its conveyor belt 20 is pivotally mounted to the frame carrying the conveyor belt 24 which will be described in connection with FIGS. 3, 4 and 5. The conveyor 24 which carries the truck loading apparatus 16 pivoted thereto is mounted to a frame which is movably mounted to a fixed main frame 26 of the harvesting machine 10, which will also be described in connection with FIGS. 3, 4 and 5.

Figure 3:
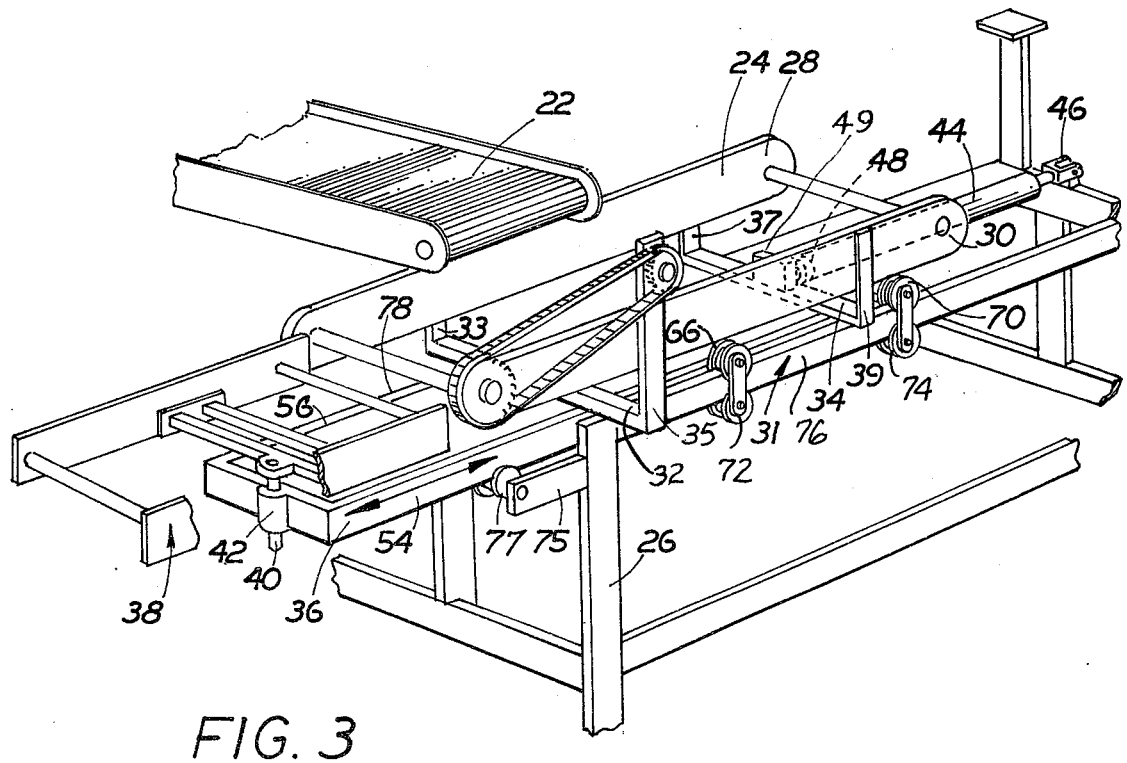
FIG. 3 is a perspective view illustrating in detail features of the truck loader of the present invention.
Figure 4:
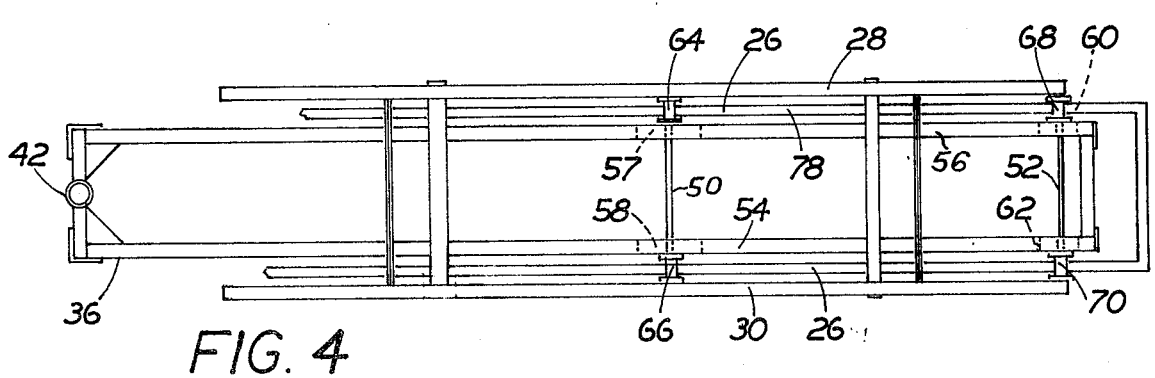
FIG. 4 is a top view of the truck loader and associated parts, in accordance with the present invention.
Figure 5:
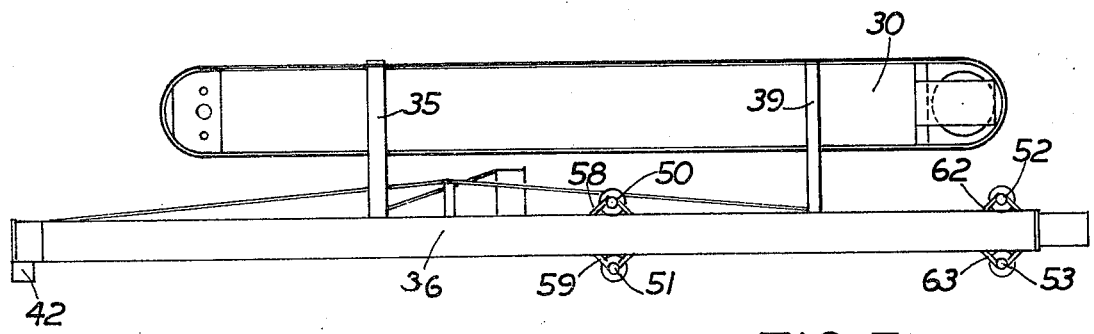
FIG. 5 is a side view of the truck loader illustrated in FIG. 4.

Referring particularly to FIGS. 3, 4 and 5, along with FIGS. 1 and 2, many of the features of the harvesting machine are omitted in order to more clearly illustrate the present invention, which relates to expanding and/or retracting the final truck loading apparatus 16. The details omitted, including such items as driving chains, gearing mechanisms and features of the conveyor belts, are well known to those skilled in the art. Because no claim is made for such conventional details, they are omitted for purposes of clarification.

The conveyor 24 is suitably mounted by conventional means to a pair of side members 28 and 30. The side members 28 and 30 rest within a frame 31 which include base members 32 and 34, front supporting posts 33 and 35, and rear supporting posts 37 and 39, which support the side members 28 and 30.

The base members 32 and 34 are made of metal and suitably welded to a movable base frame 36. The base frame 36 is adapted to move in and out in the directions of the arrows thereby carrying the frame member 31, with its attachments, in and out.

A truck loading frame 38 carries the truck loading apparatus 16 illustrated in FIG. 1. The various driving chains and belts are omitted so that the operative extension and retraction mechanism may be more clearly illustrated.

The truck loading frame 38 is pivotally connected to the base frame 36 through a pivot pin 40 connected to the frame 38 through an opening in a protruding section 42 at the end of the base frame 36. It is seen that, with the pivot connection, any movement of the base frame 36 causes corresponding movement of the truck loading frame 38. The pivot connection of the pin 40 and section 42 provides protection in the event that the truck into which the final crop is dumped is moved too close to the harvesting machine and accidentaly hits the truck loading apparatus 16. Contract between the truck and the apparatus 16 will cause the apparatus 16 to rotate about the pivot connection thereby minimizing any physical damage to the harvester machine.

Hydraulic means 44 is suitably attached to one end of the base frame 26 at joint 46. The other end of the hydraulic means is connected to an upwardly projecting section 49 of the base member 34 at a connecting joint 48. The hydraulic means 44 may be manually controlled by the operator of the harvester machine to expand or retract to cause inward or outward movement of the base frame 36, which carries the conveyor belt 22 and the truck loading apparatus 16 along with its associated parts. Control mechanisms for operating the hydraulic means 44 are well known to those skilled in the art and are only incidentally related to the present invention and hence not shown or described in detail.

The base frame 36 includes brackets 57, 58, 60 and 62 attached thereto to receive pairs of shafts 50, 51, 52 and 53. The shafts extend through the brackets which are attached to the side beams 54 and 56. In FIG. 4, the shaft 50 is illustrated with top bracket members 57 and 58. In the same Figure, the shaft 52 is illustrated with top bracket members 60 and 62. In FIG. 5 the shafts 51 and 53 are illustrated with bottom bracket members 59 and 63, respectively.

The ends of shafts 50, 51, 52 and 53 are all adapted to receive a pair of rollers. In FIG. 4, the top rollers 64 and 66 are secured to the ends of the shaft 50 with top rollers 68 and 70 being secured to the opposite ends of the shaft 52. The top shafts 50 and 52 also include pairs of rollers attached to opposite ends, such as rollers 66 and 70 illustrated in FIG. 3. FIG. 5 does not illustrate the rollers.

When the base frame 36 is extended or retracted by means of the hydraulic means 44 (FIG. 3), it rolls on a pair of front rollers connected towards the forward projecting end 75 of the frame 26. Only one such roller 77 is illustrated in FIG. 3. Another roller similar to the roller 76 is connected to the end of the frame 26 (not shown) to support the frame 36 during movement back and forth.

As the frame 36 is extended or retracted, the various other pairs of rollers, such as rollers 66, 72 and 70, 74 (FIG. 3) and pairs of rollers including top rollers 64 and 68 guide the movements thereof as they ride along the top and bottom of the side rails 76 and 78 of the main frame 26. The apparatus illustrated in FIGS. 4 and 5 also include various bracing members to provide additional strength to the structure.

Various modifications may be made to the apparatus illustrated without departing from the scope of the invention. For example, the number of rollers used to guide the movable frame 36 may be more or less than the number illustrated. Various other structural changes may also be made.

It is seen that the subject invention involving a final truck loading conveyor movable with respect to the main harvester machine has provided a number of advantages. These have included minimizing damage to cut crops, easier movement of the truck which may travel over the same hardened tracks and more even loading of the truck.

For purposes of the claims, plants are defined as including vines with crops, such as tomatoes and the like edible produces. The plants are cut by the harvester machine with the vines and crops attached. The crops are then separated from the vines.

What is claimed is:

1. In combination with a harvester machine for cutting plants with crop thereon, separating the crop from the vines of said plant and loading the separated crop into a truck, truck loading apparatus comprising:
   (a) a fixed frame attached to said harvester machine,
   (b) a movable frame movably mounted to said fixed frame,
   (c) a truck loading conveyor for delivering said crop to said truck,
   (d) means for pivotally mounting said truck loading conveyor to one end of said movable frame to permit free pivotal movement thereof about a vertical axis if physically contacted by said truck,
   (e) a second conveyor fixedly mounted to said movable frame for delivering said crop to said pivoted truck loading conveyor, and
   (f) means for extending and retracting said movable frame with respect to said fixed frame of said harvester machine to permit said truck to be loaded with said crop from said pivoted truck loading conveyor when said truck is moving at different distances alongside said harvester machine.

2. The combination as set forth in claim 1 wherein said fixed frame of said harvester machine includes a pair of side rails and said movable frame includes a plurality of rollers to guide the movement of said movable frame along said side rails when said truck loading conveyor is extended or retracted.

3. The combination as set forth in claim 2 wherein hydraulic means are disposed between said movable frame and said fixed frame to move said movable frame selected distances with respect to said fixed frame.

* * * * *